Oct. 1, 1957
W. A. CURTIS
2,808,447
DISTRIBUTOR SYSTEMS FOR INTERNAL COMBUSTION ENGINES
Filed June 9, 1952
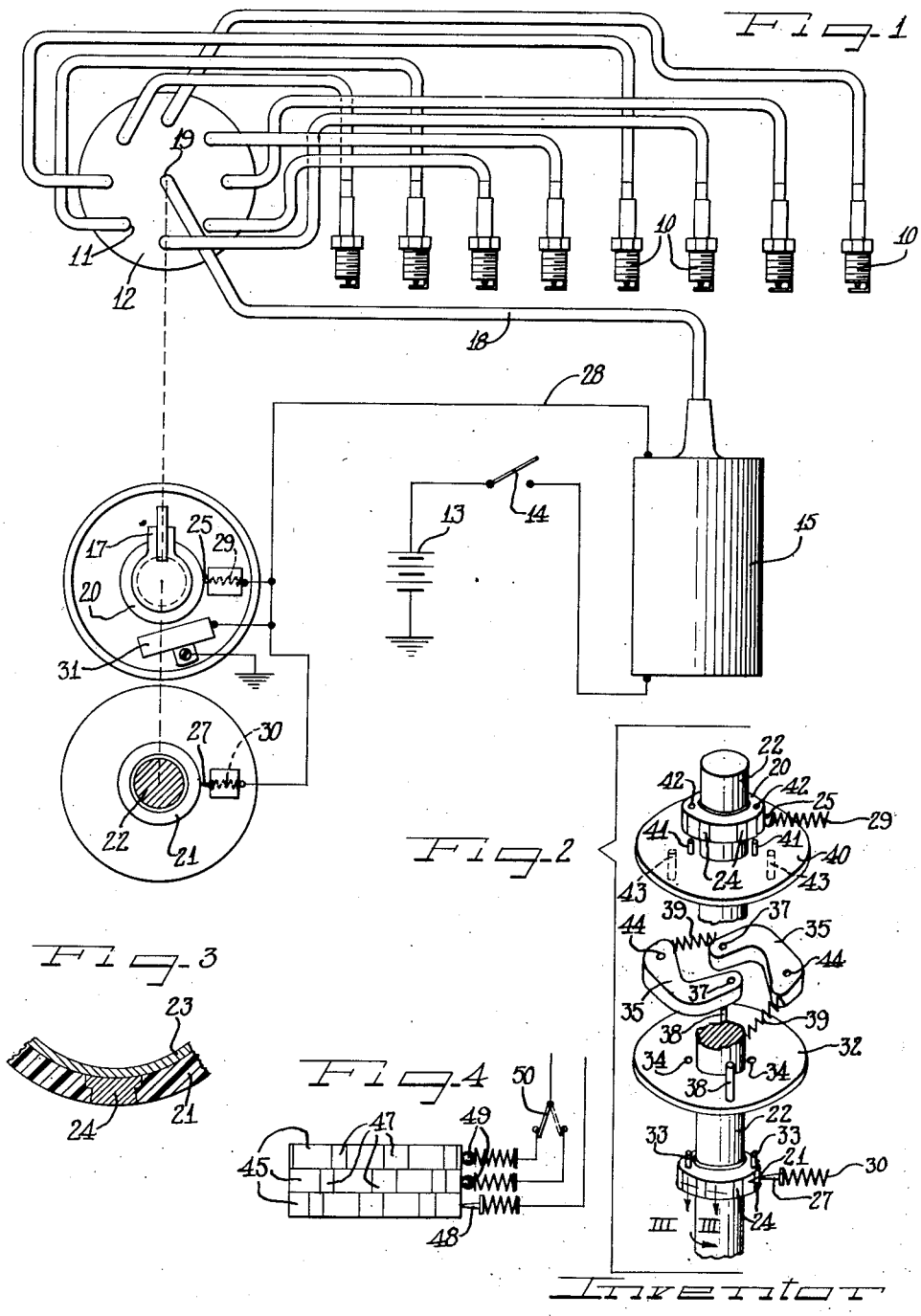
Inventor
William A. Curtis United States Patent Office 2,808,447
Patented Oct. 1, 1957

2,808,447

DISTRIBUTOR SYSTEMS FOR INTERNAL COMBUSTION ENGINES

William A. Curtis, Chicago, Ill.

Application June 9, 1952, Serial No. 292,554

8 Claims. (Cl. 123—146.5)

The present invention relates to improvements in distributor systems for internal combustion engines and more particularly concerns improvements in timing the ignition in automobile or like engines.

Internal combustion engines used for propelling vehicles through a wide speed range and relying upon an electrical ignition system are beset by the important problem of adjusting the ignition system to the varied requirements in different phases of the speed range.

In the early days of comparatively low maximum speeds of operation, means for advancing or retarding the spark by appropriate adjustments in the distributor mechanism of the ignition system, fairly well adapted the sparking intervals of the spark plugs and thus correlated the spark plug operation with the piston cycles and thus maintained reasonably uniform operation of the engine. Insofar as I am aware, no serious and at least no large scale or sustained commercial attempts were made to adjust the amount of electrical current at the spark gap at various operating speeds. This was for the reason that the total range of speeds was rather limited and the total quantity of electrical energy delivered to any spark plug at any point or any phase of the total speed range was adequate to fire the fuel charge in the low compression engines then prevalent. It was recognized, of course, that there was an intermediate speed of optimum efficiency below which there was excessive current for optimum efficiency and above which there was less current than would attain optimum efficiency. However, the efficiency differentials below and above optimum efficiency were not of practical consequence.

For some time the trend has been toward higher compression and higher speed engines. Although this trend has been in progress for an extended period of time there has heretofore apparently been no practical solution to the greatly aggravated and now quite serious problem of ignition efficiency comprehending the greatly extended speed ranges and concurrently increased compression ratios involved. Reliance has still been placed upon a compromise adjustment of the ignition system with various expedients for automatically advancing and retarding the spark. As a result, it is necessary to run the engines excessively fast during idling and to use excessively rich fuel mixtures at high speeds. This results in great waste of fuel and contributes heavily to fouling of the engine, especially at high speeds due to incomplete combustion, since no compensation has been provided in the quantity of electricity for developing the spark at the spark plugs in the various engine speeds from idling to high speed.

For maximum efficiency, the character of the spark developed by the spark plug should be uniformly adjustable to effect uniform and complete combustion at every speed of the engine throughout the range from idling to maximum speed.

The principal object of the present invention is to provide for the greatly increased efficiency in the operation of internal combustion engines utilizing ignition systems, by a major improvement in the operation of the ignition systems.

Another object of the invention is to adjust the dwell interval during which the electrical charge for each spark plug is generated in an ignition system, for every speed of operation of the associated engine, so as to attain as nearly as practicable perfect combustion in the cylinders in each cycle of operation throughout the entire operating speed ranges of the engine.

A further object of the invention is to provide improved means for adjustment in the build-up time in the development of the electrical energy in the ignition systems for internal combustion engines to accommodate a full range of operating speeds with substantially optimum efficiency at all speeds.

Still another object of the invention is to provide for dwell-compensation in an ignition system which is readily adaptable to standard types of such systems.

Yet another object of the invention is to simplify and improve the distributor mechanism for ignition systems of internal combustion engines.

Other objects, features and advantages of the present invention will be readily apparent from the following detailed description of certain preferred embodiments taken in conjunction with the accompanying drawing in which:

Figure 1 is a schematic view of an ignition system for internal combustion engines;

Figure 2 is a fragmental, exploded assembly view of one form of dwell-controlling mechanism useful in a distributor such as adapted for the system of Figure 1;

Figure 3 is an enlarged fragmentary detail sectional view taken substantially along the line III—III of Figure 2; and Figure 4 is a more or less schematic side elevational view of a modified form of dwell-controlling structure that may be used in the ignition system.

In a typical ignition system as depicted in Figure 1, a set of spark plugs 10 is provided for the respective cylinders of an internal combustion engine (not shown) and the spark plugs are electrically connected in proper cyclical order to respective distributor points 11 on a distributor head 12. In the present instance an eight cylinder engine ignition system is illustrated, but it should be understood that the system of the present invention is adaptable to any preferred number of cylinders and thus spark plugs.

Electrical energy from a suitable source such as a battery 13 is supplied under the control of an ignition switch 14 to the primary coil or coils of an ignition coil unit 15. Connection between the secondary coil or coils of the unit 15 and a rotor 17 is effected through an electrical cable structure 18 by way of a contact point 19 on the distributor head 12.

According to the present invention provision is made for properly correlating the build-up time in the ignition coil unit 15 with the operating speed requirements of the engine. While the build-up time, that is the time required for the magnetic field of the primary winding of the ignition coil unit to produce a secondary coil energizing magnetic field, is very short, it is a factor in ignition performance, particularly at high engine speeds. At high speeds the time that the conventional contact points remain closed is so short that the current and thus the magnetic primary field cannot increase to their maximum values. Of course, at low engine speeds the interval of point contact is long enough for the magnetic primary field to reach a maximum value. In fact, as conventionally practiced, the optimum efficiency setting is at a speed so substantially in excess of the idling speed, that for a really efficient idling speed the spark is too hot and engines are customarily adjusted for excessive idling speeds.

According to my novel system, however, adjustment of the dwell, or cam-angle, or build-up time of the ignition system in relation to the speed or load of an engine produces the proper amount of current output for all speeds of internal combustion engines, for starting, idling, low, intermediate and high speeds, with either step-by-step adjustment or infinitely incremental adjustment throughout the range. For this purpose the dwell is minimal at idling speeds and is maximum at top or highest speeds.

In one desirable form, dwell controlling means as suggested in Figures 1 and 2 may be employed in the distributor of the ignition system. This includes twin make and break rings 20 and 21 mounted upon a rotary timer shaft 22 adapted to be driven in the usual manner as by appropriate gear connection with the cam shaft (not shown) of an associated vehicle motor. The shaft has the rotor 17 fixedly attached to its end for rotation therewith. Each of the make and break rings 20 and 21 may be of similar construction comprising a ring body of insulating material (Figs. 2 and 3) provided with a metallic inner peripheral liner or bushing 23 which may have integral therewith or separately formed and attached thereto an appropriate series of equally spaced radially outwardly projecting contact bosses or point members 24 which are exposed at the outer periphery of the ring. It will be observed that at least to a substantial depth the sides of the point member 24 are formed to taper inwardly convergently corresponding to diminution in radius of the ring from its outer periphery toward its center. Thereby, even though the outer periphery of the ring may wear down or may be turned down within a substantial diametrical tolerance, uniformity of timing interval of a wiper or other riding contact will prevail at any given rotary speed of the make and break ring, due to the progressive radially inwardly narrowing of the point members and thus full compensation for the differential in peripheral speed at various peripheral depths or diameters of the ring.

All of the metallic electrical contact points 24 of both of the make and break rings 20 and 21 are electrically connected to ground by way of the inner diameter bushings 23 through the shaft 22. Thereby timed interval making and breaking of an electrical circuit through the primary of the ignition coil is adapted to be effected as the rings 20 and 21 rotate with the shaft 22 and a take-off contact member 25 rides the ring 20 while a take-off contact member 27 rides the periphery of the ring 21, and such contacts are connected through a lead 28 to the side of the primary opposite to that having connection with the battery 13.

One advantage of having a pair of the rings 20 and 21 and separate riding or wiper take-off contacts 25 and 27, respectively, riding the rings is that burning of one of the take-off contacts is prevented by having the other take-off contact operatively lag the one contact by predetermined interval. In the present instance the take-off contact 25 is shown as a ball urged by a spring 29 positively against the periphery of the ring 20, while take-off contacts 27 is in the form of a stylus or pin urged by a biasing spring 30 toward the periphery of the ring 21. The take-off contacts themselves may be offset to effect the lag differential, but herein the contact points 24 of the ring 20 are set normally slightly in advance of but in overlapping relation to the contact points 24 of the ring 21. Thereby not only is contact made between the contact 25 and any given one of the traveling contact points 24 of the ring 20 slightly in advance of making of contact between the contact member 27 and the corresponding contact member 24 of the ring 21, but breaking of contact between the take-off contacts and the travelling contact members 24 of the respective rings lags to an extent equal to the lag in making of contact. Thereby any possible sparking that may occur will be at the contact member 27 while the contact member 25 is free from sparking. Hence, the contact member 27 may be called a burning contact. In order to minimize, if not eliminate, sparking at the contact 27 a condenser 31 is connected into the lead 28 between the contact members 25 and 27.

Dwell control is effected by relative adjustment of the lag differential in operation of the cooperative contacts. While this may be done by relatively shifting the wiper contacts, it is herein effected by relative rotary shifting of one of the contact rings 20 and 21 with respect to the other so as to increase or decrease the break lag of the contact member 27 with respect to the contact member 25. One way of accomplishing this is centrifugally and for this purpose a disk 32 concentric about the shaft 22 is coupled for joint rotation with the ring 21 by means of pins 33 on the ring extending through coupling apertures 34 in the disk, and either the ring 21 or the disk 32 may be coupled or keyed for joint rotation with the shaft 22. A pair of identical angular centrifugal weight members 35 have respective bearing apertures adjacent the end of one leg thereof rotatably engageable about respective diametrically opposite pintles 38 carried by the disk 32. Respective biasing springs 39 connected to the weighted ends of the weight members 35 may be disposed to connect to the respective opposite pintles 38 for normally drawing the weighted ends of the centrifugal weights inwardly into normal or neutral position.

The make and break ring 20 is disposed relatively rotatably slidable about the shaft 22 and is arranged to be coupled in service assembly with a disk 40 concentric about the shaft 22, while the disk 40 is operatively coupled with the respective weighted ends of the centrifugal weight members 35 so that as the weight members 35 spread out under centrifugal force they will correspondingly turn the disk 40 and thereby the ring 20 relatively rotatably forwardly in the direction of rotation about the shaft 22 whereby to advance the contact points 24 of the ring 20 relative to the contact points 24 of the ring 21. Coupling between the disk 40 and the ring 20 may be effected by means of pins 41 carried by the disk 40 and entering respective coupling apertures 42 in the ring 20. Coupling between the disk and the weighted heads of the weight members 35 may be effected through the medium of pins 43 carried by the disk 40 engaging in appropriate sockets or apertures 44 in the weighted heads of the centrifugal weight members.

In operation, at low or idling speed the contact points 24 of the make and break ring 20 are in minimum lag differential relative to the contact points 24 of the make and break ring 21. As the speed of rotation of the shaft 22 increases proportionate to the speed of operation of the associated motor, the centrifugal weights 35 spread by proportionate increments up to a predetermined maximum speed of operation of the motor to vary the lag differential between the make and break rings 20 and 21. As a result, as the engine speed increases, the dwell interval of the timer contacts 25 and 27 correspondingly increases and thus compensates for the increased speed of rotation of the contact rings 20 and 21 with the shaft 22. This assures substantially uniform amperage in the secondary circuit of the ignition coil throughout the speed range so that just as hot a spark will be provided at the spark plug gaps during high speed as at idling speed with correspondingly highly uniform operation of the engine. It will be appreciated that much slower idling speeds can be had with the system of the present invention than with conventional spark advancing systems, and at high speeds instead of a starved spark a full amperage, hot spark will be provided. By reason of the infinitely incremental self-adjustment that occurs automatically in the operation of the system, all variables of speed from idling to maximum high speed are taken care of efficiently.

In the modified arrangement of Figure 4, a plurality of relatively fixed make and break rings 45 is provided with fixed peripherally spaced respective contact points 47 thereof relatively offset, but in progressively partial functionally overlapping relation. There may be as many of the make and break rings 45 as required for the particular installation to which the unit is to be applied. One of the rings 45 has the contact points 47 thereof in lagging relation to the contact points of all of the other rings. Riding the periphery of the lagging ring is a burning contact member 48 which corresponds to the contact member 27 previously described. Riding the periphery of each of the other rings is a respective contact member 49 which may be a ball contact member similar to the contact member 25 previously described. Dwell control is effective by selection of the respective contact ring engaged by the principal contact members 49 which will be active any given time with the lagging burning contact 48. This may be effected in any suitable manner, as by means of a selector switch 50 which may be operated in coordination with the associated vehicle, as by being integrated with the fuel throttle control of the vehicle or the accelerator.

In the operation of the device of Figure 4, at low or idling speed the contact member 49 engaging the ring 45 in minimum advanced relation to the lagging contact ring is connected into the primary circuit by means of the switch 50, while at higher speed a more advanced contact ring 45 is connected into the primary circuit by the switch 50 through the appropriate principal contact member 49.

In addition to advantages that have already been expressed herein, my dwell control ignition system eliminates the critical installation adjustments such as point settings, point alignment, spring tension, etc., involved in the installation of conventional distributors. A system according to the present invention is not unduly affected by mechanical failures, such as breaker plate wear, bushing wear, cam wear, and similar mechanical deteriorations or failures that take place after a relatively short life span of a rotor and in the conventional distributor arrangements greatly reduce the efficiency. Substantial economies in manufacture result from adoption of the dwell control ignition system of the present invention. In addition, it is easier and more economical to install. The dwell control schemes of the present invention are adaptable to the standard types of ignition systems without extensive alterations.

It will be understood that modifications and variations may be effected without departing from the scope of the novel concepts of the present invention.

I claim as my invention:

1. In combination in ignition control mechanism, a ring having a series of outer peripherally exposed electrical contacts thereon, a second ring also having a similar series of outer peripherally engageable contacts thereon, said rings being mounted for common rotation in the grounded portion of an electrical circuit including the primary of an associated ignition coil, one of said rings having the contacts thereof in normally slightly advanced relation to the contacts of the other of said rings, respective take-off contact members operative in parallel in the electrical energy source portion of the circuit and engageable in make and break relation with the peripheries of said rings, and means for relatively rotatably adjusting said rings for varying the lag differential of the respective contacts thereof, the contact member that engages said one ring being of substantially anti-friction structure and the contact member that engages the other of said rings being of generally stylus or pin type and serving as a burning contact.

2. In combination in make and break mechanism for automotive ignition systems, a plurality of annular series of make and break electrical contacts comprising at least three series co-rotatable and with the contacts of two of the series in respectively differential offset relation to the remaining series, but in overlapping relation to the contacts of said remaining series means to controllably vary the electrical lagging relation between said series of electrical contacts in accordance with the speed of rotation thereof, and, respective take-off contact elements engageable with the contacts of the respective series, said means including the take-off contact elements engageable with contacts of said two series being selectively electrically operable companion to the take-off contact associated with said remaining series.

3. In combination in make and break mechanism for an ignition distributor, an annular series of contacts, a second annular series of contacts, respective take-off contacts engageable with said series of contacts, said take-off and series of contacts being relatively rotatable in operation, one of said take-off contacts being rotatable and substantially frictionless in engagement with its series of contacts, the other of said take-off contacts being a burning wiper in engagement with its series of contacts, the series of contacts engaged by said wiper contact being in lagging relation to the other series of contacts and means to controllably vary the electrical lagging relation between said series of electrical contacts in accordance with the speed of rotation thereof.

4. In a distributor mechanism, a rotatable member, a pair of annular series of electrically conductive and non-conductive alternately disposed elements, one of said series fixed for corotation with said member, the other of said series arranged for rotation with respect to said member, said pair of annular series being arranged with the electrically conductive elements thereof in lagging but overlapping relation therebetween, and centrifugally controlled mechanism interconnecting said series fixed for rotation with said member and said series rotatable with respect to said member, said centrifugal controlled mechanism being operable to vary the lagging relation between said series in accordance with the speed of rotation of said member.

5. In a distributor mechanism, a rotatable member, a plurality of annular series of electrically conductive and non-conductive alternately arranged elements, said plurality of annular series being arranged with electrically conductive elements thereof in lagging but overlapping relation between successive respective series, certain of said series fixed for corotation with said member, certain other of said series arranged rotatably with respect to said member, and centrifugally controlled mechanism interconnecting said series fixed for rotation with said member and said series rotatable with respect to said member, said centrifugally controlled mechanism being operable to vary the lagging relation between said series in accordance with the speed of rotation of said member.

6. In a distributor mechanism, a rotatable member, a plurality of annular series of electrically conductive and non-conductive alternately arranged elements, certain of said series fixed for co-rotation with said member, certain other of said series arranged rotatably with respect to said member, and centrifugally controlled mechanism interconnecting said series fixed for rotation with said member and said series fixed for rotation with said member and said series rotatable with respect to said member.

7. In combination in make and break mechanism for an ignition distributor, an annular series of contacts provided with dielectric separators and forming therewith a cylindrical surface, a second annular series of contacts with dielectric separators forming therewith a continuous cylindrical surface, respective take-off contacts engageable with said series of contacts, said take-off contacts and series of contacts being relatively rotatable in operation, one of said series of contacts being in overlapping but advanced relation to the other of said series of contacts, said take-off contact engaging said one series of contacts being rotatable substantially frictionless upon the cylindrical surface defined by said one series of contacts and the intervening dielectric spacers, and the take-off contact that engages the other of said series of contacts comprising a generally pointed member defining a burning wiper tip.

8. In a distributor mechanism, a rotatable member, a pair of annular series of electrically conductive and non-conductive alternately disposed elements, one of said series fixed for corotation with said member, the other of said series arranged for rotation with respect to said member, said pair of annular series being arranged with the electrically conductive elements thereof in lagging but overlapping relation therebetween, and centrifugally controlled mechanism including a plate mounted fixedly with respect to said member and said series fixed for corotation with said member and thus corotatable with said fixed series and said member and being disposed between said pair of annular series of elements, said plate carrying a pair of centrifugal weight members pivoted thereon and connected to said series rotatable with respect to said member and operable in the rotation of said member to vary the lagging relation between said pair of series in accordance with the speed of rotation of said member.

References Cited in the file of this patent

UNITED STATES PATENTS

| | | |
|---|---|---|
| 1,449,347 | Pearson | Mar. 20, 1923 |
| 1,584,881 | Mallory | May 18, 1926 |
| 1,661,923 | Clay | Mar. 6, 1928 |
| 1,731,513 | Wagner | Oct. 15, 1929 |
| 2,124,528 | Kongsted | July 26, 1938 |
| 2,164,964 | Topalov | July 4, 1939 |
| 2,306,549 | Louis | Dec. 29, 1942 |
| 2,510,067 | Callander | June 6, 1950 |
| 2,520,709 | Bitler | Aug. 29, 1950 |